(12) United States Patent
Dupuis et al.

(10) Patent No.: US 12,472,128 B2
(45) Date of Patent: *Nov. 18, 2025

(54) LONG-LASTING SOLID COSMETIC COMPOSITION

(71) Applicant: CHANEL PARFUMS BEAUTE, Neuilly sur Seine (FR)

(72) Inventors: Lina Dupuis, Pantin (FR); Cyril Gibert, Pantin (FR)

(73) Assignee: CHANEL PARFUMS BEAUTE, Neuilly sur Seine (FR)

( * ) Notice: Subject to any disclaimer, the term of this patent is extended or adjusted under 35 U.S.C. 154(b) by 1191 days.

This patent is subject to a terminal disclaimer.

(21) Appl. No.: 16/918,254

(22) Filed: Jul. 1, 2020

(65) Prior Publication Data

US 2021/0000702 A1 Jan. 7, 2021

(30) Foreign Application Priority Data

Jul. 3, 2019 (FR) ..................... 19 07395

(51) Int. Cl.
| | | |
|---|---|---|
| *A61K 8/02* | (2006.01) | |
| *A61K 8/27* | (2006.01) | |
| *A61K 8/31* | (2006.01) | |
| *A61K 8/36* | (2006.01) | |
| *A61K 8/73* | (2006.01) | |
| *A61K 8/81* | (2006.01) | |
| *A61K 8/891* | (2006.01) | |
| *A61Q 1/04* | (2006.01) | |
| *A61Q 1/12* | (2006.01) | |

(52) U.S. Cl.
CPC ............ *A61K 8/025* (2013.01); *A61K 8/0254* (2013.01); *A61K 8/27* (2013.01); *A61K 8/31* (2013.01); *A61K 8/361* (2013.01); *A61K 8/731* (2013.01); *A61K 8/8152* (2013.01); *A61K 8/891* (2013.01); *A61Q 1/04* (2013.01); *A61Q 1/12* (2013.01); *A61K 2800/31* (2013.01); *A61K 2800/436* (2013.01); *A61K 2800/612* (2013.01)

(58) Field of Classification Search
CPC .......... A61K 2800/31; A61K 2800/436; A61K 2800/612; A61K 8/022; A61K 8/025; A61K 8/0254; A61K 8/0258; A61K 8/27; A61K 8/31; A61K 8/361; A61K 8/731; A61K 8/8152; A61K 8/891; A61K 8/92; A61K 2800/622; A61K 8/19; A61K 8/25; A61K 8/26; A61K 8/345; A61K 8/585; A61K 8/8147; A61K 8/87; A61K 8/89; A61K 8/922; A61K 8/925; A61K 8/987; A61Q 1/04; A61Q 1/08; A61Q 1/12; A61Q 1/02; A61Q 1/10; A61Q 19/00; A61Q 19/001

See application file for complete search history.

(56) References Cited

U.S. PATENT DOCUMENTS

| 4,648,908 A | 3/1987 | Takasuka et al. |
| 2005/0191329 A1 | 9/2005 | Taniguchi |

FOREIGN PATENT DOCUMENTS

| CN | 1925830 A | 3/2007 | |
|---|---|---|---|
| EP | 2626060 A1 | 8/2013 | |
| EP | 2928448 A2 | 10/2015 | |
| JP | S6236309 A | 2/1987 | |
| JP | 2000169339 A | 6/2000 | |
| JP | 2002302415 A * | 10/2002 | ............ A61K 8/00 |
| JP | 2003040736 A | 2/2003 | |
| JP | 2010503725 A | 2/2010 | |
| JP | 2016507482 A | 3/2016 | |
| WO | WO-02072046 A2 * | 9/2002 | ............ A61Q 1/02 |
| WO | 2008038226 A2 | 4/2008 | |
| WO | 2014086710 A2 | 6/2014 | |
| WO | WO2018100061 A1 * | 6/2018 | ............ A61Q 1/08 |

OTHER PUBLICATIONS

Machine Translation for WO 2002/072046 A2; 21 page pdf; published Sep. 19, 2002.*
French Search Report issued on Feb. 12, 2020 in corresponding French Application No. 19 07395; 4 pages.
Eye Colour Stick, ID 6387241, Mintel GNPD (http://www.gnpd.com), Mar. 2019, Search Date: Mar. 12, 2024, with partial English translation, 3 pages.

* cited by examiner

*Primary Examiner* — Jeffrey T. Palenik
(74) *Attorney, Agent, or Firm* — Maier & Maier, PLLC

(57) ABSTRACT

A solid cosmetic composition including at least 15% by weight of a volatile liquid fatty phase, 40% to 85% by weight of a powdery phase having spherical fillers which are surface-treated with a metallic soap. Also a method for preparing such a solid cosmetic composition and to a method for making up the skin or lips using same.

19 Claims, No Drawings

LONG-LASTING SOLID COSMETIC COMPOSITION

The object of the present invention is a solid cosmetic composition comprising at least 15% by weight of a volatile liquid fatty phase, 40% to 85% by weight of a powdery phase comprising spherical fillers which are surface-treated with a metallic soap. The invention also relates to a method for preparing such a solid cosmetic composition and to a method for making up the skin or lips using same.

BACKGROUND

The galenic forms conventionally adopted for solid compositions are generally free or compact powders. By way of non-limitative illustration of the solid galenic forms more particularly considered in the make-up field, mention can be made in particular of face powder, blusher or eyeshadow.

The main function of the aforementioned powders is to provide colour or a matt look or to confer coverage. In general, the powders combine a mainly majority powdery phase with a fatty phase at least in a liquid part constituting the binder and, in the context of compact powders, providing good cohesion of the powdery phase.

A powdery phase is formed mainly by fillers and colouring agents, the quantity of these being modulated in order to procure the required make-up effect, colouring, covering or matting. When the proportion of powdery phase in the product becomes too great, the manufacture and compacting thereof become complicated or even impossible to implement at an industrial level because of the quality and productivity requirements. In addition, such solid compositions with a high powdery phase content may have the drawback of being uncomfortable, too dry and too powdery and in certain cases to be fragile and brittle, with poor resistance to impact. Finally, large quantities of powdery phase in the compact powder do not give satisfactory sensory properties, making them difficult to crumble when the powder is taken from its packaging ("pick-up") and/or to spread when it is applied to the surface of the skin to be made up ("pay-off").

In order to obtain a composition in solid form, using a compacting method ("dry process") consisting of mixing the powdery phase and the fatty phase and compacting the resulting composition in a case at high pressure is known. Alternatively, a process known as "wet process" (or "slurry") can be used for producing such compositions. In this type of method, the powder phase and the fatty phase of said composition are put with a volatile solvent so as to form a suspension, which is then pressed and the volatile solvent eliminated.

Whatever the method considered, the quantity of fatty phase, and in particular of oils, does not generally exceed 10% of the composition so as to obtain good compacting of the powder via the mechanical means, and also to avoid any overflow of the composition from the case. For these reasons, these galenics very often oblige the formulators to limit the quantity of fatty phase, and in particular of oil(s), so as to ensure good compacting of the powder.

When the quantity of fatty binder is increased, the shaping of the solid composition by compacting therefore becomes complicated, or even impossible. To respond to this industrial constraint, more viscous solid products, for example obtained by extrusion, have been proposed. However, when the binding phase content is too great, the composition has a tendency to wax, that is to say to harden during use, and becomes too dense until this prevents its being taken up and its spreading properties on application are impaired.

Furthermore, solid compositions in powder form do not always maintain coverage over time and a satisfactory colour.

Solid cosmetic compositions having good cohesion and good resistance to impact, in particular able to be stored and transported freely by the user without crumbling or cracking, the texture of which allows easy taking off and application, and having good maintenance over time of coverage and colour, are still being sought.

SUMMARY

The applicant has discovered unexpectedly that a composition having such properties, which a priori cannot be reconciled, could be obtained by using, in a solid composition, a specific proportion of a particular liquid fatty phase, and a powdery phase which is at least partly surface-treated with a metallic soap.

The object of the invention is thus, according to a first aspect, a solid cosmetic composition comprising:
- at least 15% by weight of a volatile liquid fatty phase,
- 40% to 85% by weight of a powdery phase comprising spherical fillers which are surface-treated with a metallic soap, the percentages being expressed by weight, with respect to the total weight of the composition.

In particular, the object of the invention is a solid cosmetic composition comprising:
- at least 15% by weight of a volatile liquid fatty phase,
- 40% to 85% by weight of a powdery phase comprising spherical fillers which surface-treated with a metallic soap, and further comprising a lamellar filler which is surface-treated with a metallic soap, the percentages being expressed by weight, with respect to the total weight of the composition.

In particular, the object of the invention is a solid cosmetic composition comprising:
- at least 15% by weight of a volatile liquid fatty phase,
- 40% to 85% by weight of a powdery phase comprising spherical fillers which are surface-treated with a metallic soap, and further comprising a nacre which is surface-treated with a metallic soap, the percentages being expressed by weight, with respect to the total weight of the composition.

In particular, the object of the invention is a solid cosmetic composition comprising:
- at least 15% by weight of a volatile liquid fatty phase,
- 40% to 85% by weight of a powdery phase comprising spherical fillers which are surface-treated with a metallic soap, and further comprising a lamellar filler which is surface-treated with a metallic soap, and a nacre which is surface-treated with a metallic soap, the percentages being expressed by weight, with respect to the total weight of the composition.

In particular, the object of the invention is a solid cosmetic composition comprising:
- 20% to 23% by weight of a volatile liquid fatty phase, and
- 50% to 80% by weight of a powdery phase, preferably 60% to 75% by weight, the percentages being expressed by weight with respect to the total weight of the composition.

Another object of the invention, according to a second aspect, is a method for preparing such a composition, comprising:
  pre-mixing of the powders constituting the powdery phase
  preparing a fatty binder comprising the volatile liquid fatty phase and the film-forming polymer
  mashing of the powders with the fatty binder by extrusion, and
  shaping of the composition by pressing.

Another object of the invention, according to a third aspect, is a method for making up the skin and lips, consisting of applying such a solid cosmetic composition to the skin or lips.

DETAILED DESCRIPTION

Galenic

The composition according to the invention is solid, in that it does not flow under its own weight. It is preferably in the form of a viscous product, obtained by extrusion of a mixture of a powdery phase and a fatty phase, optionally in the presence of a volatile solvent that will be evaporated ("slurry" method).

Fatty Phase

The composition according to the invention comprises at least one volatile liquid fatty phase, that is to say a fatty phase comprising at least one volatile oil.

According to one embodiment, it may further comprise a non-volatile liquid fatty phase, that is to say a fatty phase comprising at least one non-volatile oil.

"Non-volatile oil" means an oil remaining on the keratin fibres at ambient temperature and atmospheric pressure for at least several hours and having in particular a vapour pressure below $10^{-3}$ mm of Hg (0.13 Pa).

The non-volatile oils may in particular be chosen from hydrocarbon or fluorinated oils and/or non-volatile silicone oils.

As non-volatile hydrocarbon oil mention can in particular be made of:
  hydrocarbon oils of animal origin,
  hydrocarbon oils of vegetable origin such as $C_4$ to $C_{36}$, preferably $C_{11}$-$C_{21}$, linear alkanes such as plant-derived squalane or Emogreen L15 from SEPPIC ($C_{15}$-19 alkane), or such as phytostearyl esters, such as phytostearyl oleate, phytostearyl isostearate and lauroyl/octyldodecyl/phytostearyl glutamate (AJINOMOTO, ELDEW PS203), triglycerides consisting of fatty acid esters and glycerol, in particular the fatty acids of which may have chain lengths varying from $C_4$ to $C_{36}$ and, in particular, from $C_{18}$ to $C_{36}$; these oils being able to be linear or branched, saturated or unsaturated; these oils may in particular be heptanoic or octanoic triglycerides, shea oil, alfalfa seed oil, poppy seed oil, Chinese ochre oil, millet oil, barley oil, quinoa oil, rye oil, candleberry oil, passion flower oil, shea butter, aloe oil, sweet almond oil, peach kernel oil, peanut oil, argan oil, avocado oil, baobab oil, borage oil, broccoli oil, calendula oil, camelina oil, carrot oil, safflower oil, hemp oil, rapeseed oil, cottonseed oil, copra oil, marrow seed oil, wheatgerm oil, jojoba oil, lily oil, macadamia oil, maize oil, meadowfoam oil, St John's wort oil, Monoi oil, hazelnut oil, apricot kernel oil, walnut oil, olive oil, evening primrose oil, palm oil, blackcurrant pip oil, kiwi fruit pip oil, grapeseed oil, pistachio oil, Chinese ochre oil, pumpkin seed oil, quinoa oil, Muscat rose oil, sesame seed oil, soya oil, sunflower seed oil (*Helianthus annuus* seed oil), castor oil and watermelon oil, ethyl olivate such as Vegeflow D10 from Innovation Company and mixtures thereof, or caprylic/capric acid triglycerides, such as those sold by the company STEARINERIES DUBOIS and those sold under the names MIGLYOL 810®, 812® and 818® by the company DYNAMIT NOBEL, synthesis ethers having 10 to 40 carbon atoms;

synthesis esters, such as the oils of formula R1 COOR2, in which R1 represents a residue of a linear or branched fatty acid comprising 1 to 40 carbon atoms and R2 represents a hydrocarbon chain, in particular branched, containing 1 to 40 carbon atoms, provided that R1+R2 is ≥10. The esters may in particular be chosen from alcohol and fatty acid esters, such as for example cetostearyl octanoate, isopropyl alcohol esters such as isopropyl myristate, isopropyl palmitate, ethyl palmitate, 2-ethyl-hexyl palmitate, isopropyl stearate or isostearate, isostearyl isostearate, octyl stearate, hydroxyl esters such as isostearyl lactate, octyl hydrostearate, diisopropyl adipate, heptanoates, and in particular isostearyl heptanoate, octanoates, decanoates or ricinoleates of alcohols or polyalcohols, such as propylene glycol dioctanoate, cetyl octanoate, tridecyl octanoate, 4-diheptanoate and ethyl 2-hexyl palmitate, alkyl benzoate, polyethylene glycol diheptanoate, diethyl propylene glycol 2-hexanoate and mixtures thereof, $C_{12}$-$C_{15}$ alcohol benzoates, hexyl laurate, neopentanoic acid esters such as isodecyl neopentanoate, isotridecyl neopentanoate, isostearyl neopentanoate, octyldodecyl neopentanoate, isononanoic acid esters such as isononyl isononanoate, isotridecyl isononanoate, octyl isononanoate, hydroxyl esters such as isostearyl lactate and di-isostearyl malate;

polyol esters and pentaerythritol esters, such as dipentaerythritol tetrahydroxystearate/tetraisostearate, dimer diol and dimer diacid esters, such as Lusplan DD-DA5® and Lusplan DD-DA7®, sold by the company NIPPON FINE CHEMICAL and described in the application US 2004/175338, dimer diol and dimer diacid copolymers and esters thereof, such as dimer dilinoleyl diol/dimer dilinoleic copolymers and esters thereof, such as for example Plandool-G, polyol and dimer diacid copolymers, and esters thereof, such as Hailuscent ISDA, fatty alcohols liquid at ambient temperature with a branched and/or unsaturated carbon chain having 12 to 26 carbon atoms, such as 2-octyldodecanol, isostearyl alcohol, oleic alcohol, 2-hexyldecanol, 2-blatyloctanol and 2-undecylpentadecanol, $C_{12}$-$C_{22}$ higher fatty acids, such as oleic acid, linoleic acid and mixtures thereof, di-alkyl carbonates, 2-chain alkyls that may be identical or different, such as dicaprylyl carbonate sold under the name CETIOL CC®, by COGNIS, oils with a high molar mass having in particular a molar mass ranging from approximately 400 to approximately 10,000 g/mol, in particular from approximately 650 to approximately 10,000 g/mol, in particular from approximately 750 to approximately 7500 g/mol, and more particularly varying from approximately 1000 to approximately 5000 g/mol, silicone oils, such as phenylated silicones such as BELSIL PDM 1000 from the company WACIER (MM-9000 g/mol) or non-phenyl silicone oils such as non-volatile polydimethylsiloxanes (PDMS), PDMSs comprising alkyl or alkoxyl groups, pendant and/or at silicone-chain ends, groups each having from 2 to 24 carbon atoms, phenylated silicones such as phenyl trimethicones, phenyl dimethicones, phenyl trimethylsiloxy diphenylsiloxanes, diphenyl dimethicones, diphenyl methyl diphenyl trisiloxanes and 2-phenylethyl trimethylsiloxysilicates, dimethicones or phenyl trimethicone with a viscosity of less than or equal to 100 cSt, and mixtures thereof, fluorinated oils that can be used in the invention are in particular fluorosilicone oils, fluorinated polyethers and fluorinated silicones as described in the document EP-A-847752.

According to a particular embodiment, the composition according to the invention further comprises a non-volatile liquid fatty phase, comprising at least one non-volatile oil.

According to a particular embodiment, the non-volatile oil used in the composition according to the invention is chosen from hydrocarbon oils, non-phenylated silicone oils and mixtures thereof.

In particular, the non-volatile liquid fatty phase comprises from 0.1% to 10% by weight of a non-volatile oil, preferably 1% to 5% by weight.

The composition according to the invention comprises at least one volatile liquid fatty phase, that is to say a fatty phase comprising at least one volatile oil.

"Volatile oil" means, within the meaning of the invention, an oil liable to evaporate in contact with keratin fibres in at least one hour, at ambient temperature and atmospheric pressure. The volatile organic solvent or solvents and the volatile oils of the invention are organic solvents and volatile cosmetic oils, liquid at ambient temperature, having a non-zero vapour pressure, at ambient temperature and atmospheric pressure, ranging in particular from 0.13 Pa to 40,000 Pa ($10^{-3}$ at 300 mm of Hg), in particular ranging from 1.3 Pa to 13,000 Pa (0.01 at 100 mm of Hg), and more particularly ranging from 1.3 Pa to 1300 Pa (0.01 at 10 mm of Hg).

In particular, the volatile liquid fatty phase may comprise at least one volatile oil chosen from hydrocarbon oils, silicone oils and mixtures thereof.

The volatile oil may be hydrocarbon. The hydrocarbon volatile oil may be chosen from hydrocarbon oils having from 7 to 16 carbon atoms. As a hydrocarbon volatile oil having from 7 to 16 carbon atoms, mention can be made in particular of $C_8$-$C_{16}$ branched alkanes such as $C_8$-$C_{16}$ isoalkanes (also referred to as isoparaffins), isododecane, isodecane, isohexadecane and for example the oils sold under the trade names Isopars or Permetyls, $C_8$-$C_{16}$ branched esters such as iso-hexyl neopentanoate, and mixtures thereof. Preferably, the hydrocarbon volatile oil having from 8 to 16 carbon atoms is chosen from isododecane, isodecane, isohexadecane and mixtures thereof, and is in particular isododecane.

The volatile oil may be a volatile linear alkane. According to one embodiment, an alkane that is suitable for an invention may be a volatile linear alkane comprising from 7 to 14 carbon atoms. Such a volatile linear alkane may advantageously be of vegetable origin. By way of example of alkanes suitable for the invention, mention can be made of the alkanes described in the patent applications of the company Cognis WO 2007/1068371, or WO 2008/155059 (mixtures of distinct alkanes differing by at least one carbon atom). These alkanes are obtained from fatty alcohols, themselves obtained from copra or palm oil. By way of example of linear alkanes suitable for the invention, mention can be made of n-heptane ($C_7$), n-octane ($C_8$), n-nonane ($C_9$), n-decane ($C_{10}$), n-undecane ($C_{11}$), n-dodecane ($C_{12}$), n-tridecane ($C_{13}$), n-tetradecane ($C_{14}$), and mixtures thereof. According to a particular embodiment, the volatile linear alkane is chosen from n-nonane, n-undecane, n-dodecane, n-tridecane, n-tetradecane, and mixtures thereof. According to a preferred embodiment, mention can be made of the mixtures of un-decane ($C_{11}$) and n-tridecane ($C_{13}$) obtained in examples 1 and 2 of the application WO 2008/15505 of the company Cognis. Mention can also be made of the mixture of n-undecane ($C_{11}$) and n-tridecane ($C_{13}$) sold by the company BASF under the name CETIOL ULTIMATE. Mention can also be made of n-dodecane ($C_{12}$) and n-tetradecane ($C_{14}$) sold by Sasol respectively under the references PARAFOL 12-97 and PARAFOL 14-97, as well as mixtures thereof. Mention can also be made of the $C_9$-$C_{12}$ alkane sold under the reference VEGELIGHT SILK by the company Biosynthis. Use can be made of the volatile linear alkane alone or preferentially a mixture of at least two distinct volatile linear alkanes, differing from each other by a number of carbon atoms n of at least 1, in particular differing from each other by a number of carbon atoms of 1 or 2.

The volatile oil may be a volatile silicone oil such as cyclic polysiloxanes, linear polysiloxanes and mixtures thereof. As linear volatile polysiloxanes, mention can be made of hexamethyldisiloxane, octamethyltrisiloxane, decamethyltetrasiloxane, tetradecamethylhexasiloxane and hexadecamethylheptasiloxane. As cyclic volatile polysiloxanes, mention can be made of hexamethylcyclotrisiloxane, decamethylcyclopentasiloxane and octamethylcyclotetrasiloxane, dodecamethylcyclohexasiloxane.

In a variant or additionally, the composition produced may comprise at least one fluorinated volatile oil.

According to a preferred embodiment, the composition according to the invention comprises at least 15% by weight of a volatile liquid fatty phase, preferably 20% to 23% by weight of a volatile liquid fatty phase.

The composition according to the invention may also comprise a solid fatty phase, comprising at least one wax and/or a viscous fatty substance and/or a lipophilic gelling agent.

According to a preferred embodiment, the composition according to the invention comprises from 0.1% to 15% by weight, preferably from 0.5% to 10% by weight of a solid fatty phase.

Waxes

The composition according to the invention may comprise at least one wax.

The wax considered in the context of the present invention is in general terms a lipophilic compound, solid at ambient temperature (25° C.), with a reversible solid/liquid state change, having a melting point higher than or equal to 30° C., which may range up to 120° C.

In particular, the waxes suitable for the invention may have a melting point of above approximately 45° C., and in particular higher than 55° C. The melting point of the wax may be measured by means of a differential scanning calorimeter (DSC), for example the calorimeter sold under the name DSC 30 by the company METLER.

The waxes able to be used in the compositions according to the invention are chosen from among solid waxes, deformable or not at ambient temperature, of animal, vegetable, mineral or synthetic origin and mixtures thereof.

The wax may also have a hardness ranging from 0.05 MPa to 30 MPa, and preferably ranging from 6 MPa to 15 MPa. The hardness is determined by measuring the compressive force measured at 20° C. by means of a texturometer sold under the name TA-TX2i by the company RHEO, equipped with a 2 mm diameter stainless-steel cylinder moving at a measuring speed of 0.1 mm/s, and penetrating the wax to a penetration depth of 0.3 mm.

It is in particular possible to use hydrocarbon waxes such as lanolin wax, and Chinese insect waxes; rice wax, carnauba wax, candelilla wax, ouricurry wax, alfa wax, corkfibre wax, sugarcane wax, Japan wax and sumac wax; montan wax, microcrystalline waxes, paraffins and ozokerite; beeswax, jojoba wax, mimosa wax, sunflower wax, polyethylene waxes, the waxes is obtained by Fisher-Tropsch synthesis and waxy copolymers as well as esters thereof. A mixture of jojoba wax, mimosa wax and sunflower wax is for example sold under the reference ACTICIRE MP by the company GATTEFOSSE. In particular, the hydrocarbon waxes may be chosen from carnauba wax, beeswax, jojoba wax, mimosa wax, sunflower wax and mixtures thereof.

Mention can also be made of the waxes obtained by the catalytic hydrogenation of animal or vegetable waxes having $C_8$-$C_{32}$ linear or branched fatty chains.

Among these, mention can be made in particular of hydrogenated jojoba oil, hydrogenated sunflower oil, hydrogenated ricin oil, hydrogenated copra oil and hydrogenated lanolin oil, di-(trimethylol-1,1,1 propane) tetrastearate sold under the name "HEST 2T-4S" by the company HETERENE, and di-(trimethylol-1,1,1 propane) tetrabehenate sold under the name HEST 2T-4B by the company HETERENE.

Use can also be made of the waxes obtained by transesterification and hydrogenation of vegetable oils, such as ricin or olive oil, such as the waxes sold under the names Phytowax Ricin 16L64® and 22L73® and Phytowax Olive 18L57 by the company SOPHIM. Such waxes are described in the application FR-A-2792190.

Use can also be made of silicone waxes, which may advantageously be substituted polysiloxanes, preferably with a low melting point. These silicone waxes are known or can be prepared in accordance with known methods. Among the commercial silicone waxes of this type, mention can be made in particular of those sold under the names Abilwax 9800, 9801 or 9810 (GOLDSCHMIDT), KF910 and KF7002 (SHIN ETSU), or 176-1118-3 and 176-11481 (GENERAL ELECTRIC), alkyl- or alkoxydimethicones such as the following commercial products: Abilwax 2428, 2434 and 2440 (GOLDSCHMIDT), or VP 1622 and VP 1621 (WACKER), as well as ($C_{20}$-$C_{60}$) alkyldimethicones, in particular ($C_{30}$-$C_{45}$) alkyldimethicones such as the silicone wax sold under the name SF-1642 by the company GE-Bayer Silicones.

Use can also be made of hydrocarbon waxes modified by silicone or fluorinated groups such as for example: siliconyl candelilla, siliconyl beeswax and Fluorobeeswax from Koster Keunen.

The waxes may also be chosen from fluorinated waxes.

According to a particular embodiment, the compositions according to the invention may comprise at least one so-called sticky wax. As a sticky wax, use can be made of a $C_{20}$-$C_{40}$ alkyl(hydroxystearyloxy) stearate (the alkyl group comprising 20 to 40 carbon atoms), alone or in a mixture, in particular a $C_{20}$-$C_{40}$ alkyl 12-(12'-hydroxystearyloxy) stearate. Such a wax is in particular sold under the names "Kester Wax K 82 P®" and "Kester Wax K 80 P®" by the company KOSTER KEUNEN.

According to a preferred embodiment, the waxes are chosen from hydrocarbon waxes, preferably chosen from carnauba wax, beeswax, jojoba wax, mimosa wax, sunflower wax, and mixtures thereof.

Viscous Fatty Substances

The solid fatty phase may also comprise a hydrocarbon, silicon and/or fluorinated viscous fatty substance, or a mixture thereof.

"Viscous fatty substance", within the meaning of the present invention, means a lipophilic fatty compound with a reversible solid/liquid state change having in the solid state an anisotropic crystalline organisation, and comprising a liquid fraction and a solid fraction at a temperature of 23° C.

In other words, the commencing melting point of the viscous fatty substance may be below 23° C. The liquid fraction of the viscous fatty substance measured at 23° C. may represent from 9% to 97% by weight of the viscous fatty substance. This fraction liquid at 23° C. preferably represents between 15% and 85%, preferably again between 40% and 85% by weight.

Within the meaning of the invention, the melting point corresponds to the temperature of the most endothermic peak observed in thermal analysis (DSC) as described in ISO 11357-3:1999. The melting point of a viscous fatty substance can be measured by means of a differential scanning calorimeter (DSC) for example the calorimeter sold by the name "MDSC 2920" by the company TA Instruments.

The measuring protocol is as follows:

A 5 mg sample of viscous fatty substance disposed in a crucible is subjected to a first temperature rise ranging from −20° C. to 100° C., at a heating speed of 10° C./minute, is then cooled from 100° C. to −20° C. at a cooling speed of 10° C./minute and is finally subjected to a second temperature rise ranging from −20° C. to 100° C. at a heating speed of 5° C./minute. During the second temperature rise, the variation in the difference in power absorbed by the empty crucible and by the crucible containing the sample of viscous fatty substance is measured as a function of the temperature. The melting point of the viscous fatty acid is the temperature corresponding to the top of the peak of the curve representing the variation in the difference in absorbed power as a function of temperature.

The liquid fraction by weight of the viscous fatty substance at 23° C. is equal to the ratio of the consumed melting enthalpy at 23° C. to the melting enthalpy of the viscous fatty substance. The melting enthalpy of the viscous fatty substance is the enthalpy consumed by the latter in order to change from the solid state to the liquid state. The viscous fatty substance is said to be in the solid state when the whole of the mass thereof is in crystalline solid form. The viscous fatty substance is said to be in the liquid state when the whole of the mass thereof is in liquid form.

The melting enthalpy of the viscous fatty substance is equal to the area under the curve of the thermogram obtained by means of a differential scanning calorimeter (DSC), such as the calorimeter sold under the name MDSC 2920 by the company TA Instrument, with a temperature rise of 5° or 10° C. per minute, in accordance with ISO 11357-3:1999.

The melting enthalpy of the viscous fatty substance is the quantity of energy necessary for changing the viscous fatty substance from the solid state to the liquid state. It is expressed in J/g.

The melting enthalpy consumed at 23° C. is the quantity of energy absorbed by the sample in order to change from the solid state to the state that it has at 23° C. consisting of a liquid fraction and a solid fraction.

The liquid fraction of the viscous fatty substance measured at 32° C. preferably represents from 30% to 100% by weight of the viscous fatty substance, preferably from 50% to 100%, preferably again from 60% to 100% by weight of the viscous fatty substance. When the liquid fraction of the viscous fatty substance measured at 32° C. is equal to 100%, the temperature of the end of the melting range of the viscous fatty substance is less than or equal to 32° C.

The liquid fraction of the viscous fatty substance measured at 32° C. is equal to the ratio of the consumed melting enthalpy at 32° C. to the melting enthalpy of the viscous fatty substance. The consumed melting enthalpy at 32° C. is calculated in the same way as the consumed melting enthalpy at 23° C.

The viscous fatty substance is preferably chosen from synthetic fatty substances and fatty substances of vegetable origin. A viscous fatty substance can be obtained by synthesis from starting products of vegetable origin.

The viscous fatty substance is advantageously chosen from:
  lanolin and derivatives thereof,
  polyol ethers chosen from pentaerythritol ethers and polyalkylene glycol ethers,
  fatty and sugar alcohol ethers, and mixtures thereof, pentaerythritol ether and polyethylene glycol ether comprising 5 oxyethylene units (5 OE) (CTFA name: PEG-5 pentaerythrityl ether), pentaerythritol ether and polypropylene glycol ether comprising 5 oxypropylene units (5 OP) (CTFA name: PPG-5 pentaerythrityl ether), and mixtures thereof and more specially the PEG-5 Pentaerythrityl Ether, PPG-5 Pentaerythrityl Ether and soya oil, sold under the name "Lanolide" by the company VEVY, a mixture where the constituents are in a ratio by weight 46/46/8: 46% PEG-5 pentaerythrityl ether, 46% PPG-5 pentaerythrityl ether and 8% soya oil,
  silicone compounds, polymers or not,
  fluorinated compounds, polymers or not,
  vinyl polymers, in particular olefin homopolymers and copolymers, and hydrogenated diene homopolymers and copolymers,
  liposoluble polyethers resulting from polyetherification between one or more $C_2$-$C_{100}$ diols, preferably $C_2$-$C_{50}$, esters,
and/or mixtures thereof.

The viscous fatty substance is preferably a polymer, in particular hydrocarbon.

Among liposoluble polyethers, the preference is in particular for ethylene oxide and/or propylene-oxide copolymers with $C_6$-$C_{30}$ long chain alkylene-oxides, preferably again such that the ratio by weight of the ethylene-oxide and/or propylene oxide with alkylene-oxides in the copolymer is 5:95 to 70:30. In this family, mention will be made in particular of copolymers such as long-chain alkylenes-oxides disposed in blocks having a mean molecular weight of 1,000 to 10,000, for example a block copolymer of polyoxyethylene/polydodecyl glycol such as the ethers of dodecanediol (22 mol) and polyethylene glycol (45 OE) marketed under the name ELFACOS ST9 by AKZO NOBEL.

Among the esters, the following are in particular preferred:
  the esters of a glycerol oligomer, in particular the diglycerol esters, especially condensates of adipic acid and glycerol, for which some of the hydroxyl groups of the glycerols have reacted with a mixture of fatty acids such as stearic acid, capric acid, stearic acid, isostearic acid and 12-hydroxystearic acid, like in particular those sold under the trade name Softisan649 by the company SASOL,
  the arachidyl propionate sold under the trade name Waxenol 801 by ALZO,
  phytosterol esters,
  fatty acid triglycerides and derivatives thereof,
  pentaerythritol esters,
  dimer diol and dimer diacid esters, where applicable esterified on their free alcohol or acid functions by acid or alcohol radicals, in particular dimer dilinoleate esters, such esters may in particular be chosen from the esters with the following INCI names: bis-behenyl/isostearyl/phytostearyl dimerdilinoleyl dimerdilinoleate (Plandool G), phytostearyl isostearyl dimerdilinoleate (Lusplan PI-DA, Lusplan PHY/IS-DA), phytostearyl/isostearyl/cetyl/stearyl/behenyl dimerdilinoleate (Plandool H or Plandool S) and mixtures thereof,
  mango butter, such as the one sold under the reference Lipex 203 by the company AARHUSKARLSHAMN,
  hydrogenated soya oil, hydrogenated copra oil, hydrogenated rapeseed oil, mixtures of hydrogenated vegetable oils such as the mixture of hydrogenated vegetable oil of soya, copra, palm and rapeseed, for example the mixture sold under the reference Akogel® by the company AARHUSKARLSHAMN (INCI name Hydrogenated Vegetable Oil),
  shea butter, in particular the one the INCI name of which is Butyrospermum Parkii Butter, such as the one sold under the reference Sheasoft® by the company AARHUSKARLSHAMN,
  cocoa butter, in particular the one that is sold under the name CT COCOA BUTTER DEODORIZED by the company DUTCH COCOA BV or the one that is sold under the name BEURRE DE CACAO NCB HD703 758 by the company BARRY CALLEBAUT;
  shorea butter, in particular the one that is sold under the name DUB SHOREA T by the company STEARINERIE DUBOIS;
  and mixtures thereof.

Lipophilic Gelling Agents

Apart from waxes, the composition according to the invention may comprise at least a lipophilic gelling agent, for example consisting of styrene and olefin copolymers such as ethylene, propylene and/or butylene, optionally associated with silicone or hydrocarbon solvents, as described in particular in the application WO 98/38981 and in the patent U.S. Pat. No. 6,309,629, or the styrene and butadiene copolymers such as those sold under the reference OleaoFLEX EG 200 by the company Applechem. They comprise in particular the gelling agents based on sequenced terpolymers available from the company PENRECO under the trade name VERSAGEL®. Another type of lipophilic gelling agent consists of polymers such as those identified by the INCI name polyamide-3 and in particular the polymers SYLVACLEAR® AF 1900V and PA 1200V available from the company ARIZONA CHEMICAL as well as those identified by the INCI name "Ethylenediamine/Hydrogenated Dimer Dilinoleate Copolymer Bis-Di-C14-18 Alkyl Amide" and available for example under the trade name SYLVACLEAR® A200V or SYLVACLEAR® A2614V from the company ARIZONA CHEMICAL. The lipophilic gelling agent may in a variant be a bentone or a hydrophobic modified hectorite. The gelling agent of the oils may also be a polyurethane gelling agent, preferably of natural origin such as a derivative of ricin oil available for example under the trade name EstoGel® M by the company Polymerexpert.

Powdery Phase

The composition according to the invention also comprises at least one powdery phase comprising spherical fillers surface-treated by a metallic soap. The powdery phase may also comprise a lamellar filler surface-treated by a metallic soap, a nacre surface-treated by a metallic soap or both. The powdery phase may, preferably, also comprise pigments, optionally surface-treated by a metallic soap.

Surface Treatment

The powdery phase used in the compositions according to the invention is at least partially surface-treated by a metallic soap.

In particular, the powdery phase comprises spherical fillers which are surface-treated by a metallic soap.

In particular, the powdery phase comprises spherical fillers which are surface-treated by a metallic soap and further comprises a lamellar filler which is surface-treated by a metallic soap.

In particular, the powdery phase comprises spherical fillers which are surface-treated by a metallic soap and further comprises a nacre which is surface-treated by a metallic soap.

In particular, the powdery phase comprises spherical fillers which are surface-treated by a metallic soap and further comprises a lamellar filler which is surface-treated by a metallic soap and a nacre surface-treated by a metallic soap.

In particular, the metallic soap is a fatty acid soap having 12 to 22 carbon atoms, and in particular 12 to 18 carbon atoms.

The metal of the metallic soap for its part is preferably chosen from zinc and magnesium.

Thus, according to a preferred embodiment, the metallic soap is chosen from zinc borate, magnesium stearate, magnesium myristate, zinc stearate, and mixtures thereof, and preferably the metallic soap is magnesium stearate.

Fillers

The fillers may be mineral or organic.

The powdery phase comprises at least one spherical filler. The spherical fillers are advantageously chosen from:
  silica powders;
  powders of acrylic (co) polymers, and derivatives thereof, in particular the powders of acrylate (co) polymer and derivatives thereof, advantageously chosen from a methyl polymethacrylate powder, a methyl polymethacrylate/ethylene glycol dimethacrylate powder, an allyl polymethacrylate/ethylene glycol dimethacrylate powder, an ethylene glycol dimethacrylate/lauryl methacrylate copolymer powder, an acrylate/alkyl acrylate copolymer, optionally crosslinked, powder, the expanded hollow particles of acrylonitrile (co) polymer, and mixtures thereof;
  polyurethane powders;
  silicone powders advantageously chosen from a powder of polymethylsilsesquioxane, of organopolysiloxane elastomer coated with silicone resin, a powder of organosilicone particles;
  polyamide powders, such as Nylon®, in particular Nylon 12;
  cellulose powders, such as Cellulobeads D5, D10, D50 and D100 sold by the company Daito,
  and a mixture or mixtures thereof.

The composition may further comprise a lamellar filler. Among lamellar fillers, mention can be made of talc, natural or synthetic mica, certain silicas, clays such as magnesium and aluminium silicate, trimethyl siloxysilicate, kaolin, bentone, calcium carbonate and magnesium hydrogen carbonate, hydroxyapatite, boron nitride, fluorphlogopite, perlite powders, an N-lauroyl lysin powder sericite, calcium sodium borosilicate, calcium aluminium borosilicate, and a mixture or mixtures thereof.

Among lamellar fillers, there is a preference for talc, natural or synthetic mica, certain silicas, clays such as magnesium and aluminium silicate, trimethyl siloxysilicate, kaolin, bentone, calcium carbonate and magnesium hydrogen carbonate, hydroxyapatite, fluorphlogopite, perlite powders, an N-lauroyl lysine powder, sericite, calcium sodium borosilicate, calcium aluminium borosilicate and a mixture or mixtures thereof.

The composition may further comprise an additional filler. The additional filler may be chosen from mineral or organic fillers of any form, lamellar, spherical (or hemispherical), whatever the crystallographic form (for example leaf, cubic, hexagonal, orthorhombic, etc).

According to a preferred embodiment, the powdery phase comprises lamellar and spherical fillers in a lamellar/spherical ratio ranging from 1/10 to 10/1, preferably 1/5 to 9/1. This ratio is a ratio by weight.

"Pigments" means white or coloured particles, mineral or organic, insoluble in an aqueous medium, intended to colour and/or opacify the composition.

The pigments may be white or coloured, mineral and/or organic.

The pigment may be an organic pigment. Organic pigment means any pigment that meets the definition in the Ullmann encyclopaedia in the organic pigment chapter. The organic pigment may in particular be chosen from nitroso, nitro, azo, xanthene, quinolene, anthraquinone or phthalocyanin compounds, of the metallic complex, isoindolinone, isoindoline, quinacridone, perinone, perylene, dicetopyrrolopyrrole, thioindigo, dioxazine, triphenylmethane or quinophthalone type.

The organic pigment or pigments may be chosen for example from carmine, carbon black, aniline black, melanin, azo yellow, quinacridone, phthalocyanin blue, sorgho red, the blue pigments codified in the Colour Index under the references C1 42090, 69800, 69825, 73000, 74100, 74160, the yellow pigments codified in the Colour Index under the references C1 11680, 11710, 15985, 19140, 20040, 21100, 21108, 47000, 47005, the green pigments codified in the Colour Index under the references C1 61565, 61570, 74260, the orange pigments codified in the Colour Index under the references C111725, 15510,45370, 71105, the red pigments codified in the Colour Index under the references CI 12085, 12120, 12370, 12420, 12490, 14700, 15525, 15580, 15620, 15630, 15800, 15850, 15865, 15880, 17200, 26100, 45380, 45410, 58000, 73360, 73915, 75470, the pigments obtained by oxidizing polymerisation of indolic or phenolic derivatives as described in the patent FR 2 679 771.

These pigments may also be in the form of composite pigments as described in the patent EP 1 184 426. The composite pigments may be compounds in particular of particles comprising an inorganic core covered at least partially with an organic pigment and at least one binder fixing the organic pigments on the core.

The pigment may also be a lacquer. Lacquer means insolubilised dyes adsorbed on insoluble particles, the whole thus obtained remaining insoluble during use. By way of examples of lacquers, mention can be made of the product known by the following name: D & C Red 7 (CI 15 850:1).

The pigment may be a mineral pigment. Mineral pigment means any pigment that meets the definition of the Ullmann encyclopaedia in the chapter inorganic pigment. Mention can be made, among the mineral pigments useful in the present invention, of zirconium or cerium oxides, as well as oxides of zinc, iron (black, yellow or red) or chromium, manganese violet, ultramarine, chromium hydrate and ferric blue, titanium dioxide, metallic powders such as aluminium powder and copper powder. The following mineral pigments may also be used: $Ti_2O_5$, $Ti_3O_5$, $Ti_2O_3$, $TiO$, $ZrO_2$ in a mixture with $TiCO_2$, $ZrO_2$, $Nb_2O_5$, $CeO_2$, $ZnS$.

The size of the pigment used in the context of the present invention is generally between 10 nm and 10 µm, preferably between 20 nm and 5 µm, and more preferentially between 30 nm and 1 µm.

The colouring agent may also be a soluble dye, preferably soluble in water.

Among the water-soluble dyes, mention can be made of cochineal carmine or the products known by the following names: D & C Red 21 (CI 45 380), D & C Orange 5 (CI 45 370), D & C Red 27 (CI 45 410), D & C Orange 10 (CI 45 425), D & C Red 3 (CI 45 430), D & C Red 4 (CI 15 510), D & C Red 33 (CI 17 200), D & C Yellow 5 (CI 19 140), D & C Yellow 6 (CI 15 985). D & C Green (CI 61 570), D & C Yellow 1 O (CI 77 002), D & C Green 3 (CI 42 053), D & C Blue 1 (CI 42 090).

The nacres may be chosen from those conventionally present in make-up products, such as mica/titanium dioxide. As a variant, they may be nacres based on mica/silica/titanium dioxide, based on synthetic fluorphlogopite/titanium dioxide (SUNSHINE® n MAPRECOS), calcium sodium borosilicate/titanium dioxide ((REFLECKS® from ENGELHARD) or calcium aluminium borosilicate/silica/titanium dioxide ((RONASTAR® from MERCK).

The composition according to the invention comprises from 40% to 85% by weight powdery phase, preferably 50% to 80% by weight, with respect to the total weight of the composition according to the invention.

Polyols

The composition according to the invention may also comprise at least one polyol.

Polyol means any organic molecule having in the structure thereof at least two free hydroxy (—OH) groups. These polyols are preferably liquid at ambient temperature (25° C.).

By way of example polyols suitable for use in the composition can be chosen from propylene glycol, butylene glycol, pentylene glycol, pentanediol, isoprene glycol, neopentyl glycol, glycerol, polyethylene glycols (PEGs) having in particular 4 to 8 ethylene glycol units and/or sorbitol.

Preferably, the polyol is glycerol.

According to a particular embodiment, the composition according to the invention comprises from 2% to 30% by weight polyols, preferably from 5% to 25% by weight, with respect to the total weight of the composition.

Emulsifier

The composition according to the invention may also comprise an emulsifier.

These emulsifiers may be chosen from non-ionic, anionic, cationic or amphoteric surfactants or polymeric surfactants.

According to one embodiment, the surfactants able to be used in the context of the invention are chosen from non-ionic surfactants with an HLB of between 8 and 20 at 25° C. Mention can be made in particular of:

esters and ethers of oses such as the mixture of cetyl stearyl glucoside and cetyl and stearyl alcohols such as Montanov 68 from Seppic;

glycerol oxyethylene and/or oxypropylene ethers (which may comprise from 1 to 150 oxyethylene and/or oxypropylene groups);

fatty alcohol oxyethylene and/or oxypropylene ethers (which may comprise from 1 to 150 oxyethylene and/or oxypropylene groups) (in particular $C_8$-$C_{24}$ alcohol, preferably $C_{12}$-$C_{18}$) such as cetearylic alcohol oxyethylene ether with 30 oxyethylene groups (CTFA name "Ceteareth-30"), stearyl alcohol oxyethylene ether with 20 oxyethylene groups (CTFA name "Steareth-20"), the oxyethylene ether of the $C_{12}$-$C_{15}$ fatty alcohol mixture comprising 7 oxyethylene groups (CTFA name "$C_{12}$-15 Pareth-7") in particular sold under the trade name NEODOL 25-7® by SHELL CHEMICALS the fatty acid (in particular $C_8$-$C_{24}$ acid, and preferably $C_{16}$-$C_{22}$) and polyethylene glycol (which may comprise from 1 to 150 ethylene glycol units) esters such as the PEG-50 stearate and the PEG-40 monostearate in particular, sold under the name MYRJ 52P® by the company ICI UNIQUEMA, or the PEG-30 glyceryl stearate in particular sold under the name TAGAT S® by the company Evonik GOLDSCHMIDT;

the fatty acid esters (in particular $C_8$-$C_{24}$ acid, and preferably $C_{16}$-$C_{22}$) and oxyethylene and/or oxypropylene glycerol ethers (which may comprise from 1 to 150 oxyethylene and/or oxypropylene groups), such as the PEG-200 glyceryl monostearate in particular sold under the name Simulsol 220 TM® by the company SEPPIC; the polyethoxylated glyceryl stearate with 30 ethylene oxide groups such as the product TAGAT S® sold by the company Evonik GOLDSCHMIDT, the polyethoxylated glyceryl oleate with 30 ethylene oxide groups such as the product TAGAT OR sold by the company Evonik GOLDSCHMIDT, the polyethoxylated glyceryl cocoate with 30 ethylene oxide groups such as the product VARIONIC LI 13® sold by the company SHEREX, the polyethoxylated glyceryl isostearate with 30 ethylene oxide groups such as the product TAGAT L® sold by the company Evonik GOLDSCHMIDT and the polyethoxylated glyceryl laurate with 30 ethylene oxide groups such as the product TAGAT I® from the company Evonik GOLDSCHMIDT, the fatty acid esters (in particular $C_8$-$C_{24}$ acid, and preferably $C_{16}$-$C_{22}$) and oxyethylene and/or oxypropylene sorbitol ethers (which may comprise from 1 to 150 oxyethylene and/or oxypropylene groups), such as the polysorbate 20 in particular sold under the name Tween 20® by the company CRODA, or the polysorbate 60 in particular sold under the name Tween 60® by the company CRODA, dimethicone copolyol, such as the one sold under the name Q2-5220® by the company DOW CORNING, dimethicone copolyol benzoate (FINSOLV SLB 101® and 201® from the company FINTEX), the copolymers of propylene oxide and ethylene oxide, also called polycondensates OE/OP the lysophospholipids, in particular the lysophosphatidylcholine of the following formula [CHEM1]:

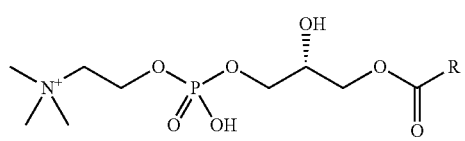

[Chem. 1]

where R is a fatty acid chain, comprising in particular from 10 to 25 carbon atoms, preferably 15 to 20. Preferably, the lysophospholipid used in the composition of the invention comes from soya seeds. Preferably again, its INCI name is glycine soya (soybean) seed extract. For example, use is made of the mixture of glycerin at 80% by weight and glycine soya (soybean) seed extract at 20% by weight sold by Kemin under the name Lysofix Liquid®;

emulsifying waxes such as the autoemulsifying wax sold under the name Polawax NF by Croda, or the beeswax PEG-8 sold under the name Apifil by Gattefossé, and mixtures thereof.

According to a preferred embodiment, the emulsifying agent with an HLB of between 8 and 20 is chosen from fatty acid esters and oxyethylene or oxypropylene sorbitol ethers, and mixtures thereof.

Lysophospholipids such as Lysofix Liquid® allow thickening of the composition.

According to one embodiment, the surfactants that can be used in the composition according to the invention are chosen from non-ionic surfactants with an HLB of less than or equal to 8 at 25° C. Mention can be made in particular of:

esters and ethers of oses such as sucrose stearate, sucrose cocoate, sorbitan stearate and mixtures thereof, such as Arlatone 2121® sold by the company ICI;

the oxyethylene and/or oxypropylene ethers (which may comprise from 1 to 150 oxyethylene and/or oxypropylene groups) of fatty alcohols (in particular $C_8$-$C_{24}$ alcohol, and preferably $C_{12}$-$C_{18}$) such as stearyl alcohol ethylene ether with 2 oxyethylene groups (CTFA name "Steareth-2");

fatty acid esters (in particular $C_8$-$C_{24}$ acid, and preferably $C_{16}$-$C_{22}$) and a polyol, in particular glycerol or sorbitol, such as glyceryl stearate, such as the product sold under the name TEGIN M® by the company Evonik GOLDSCHMIDT, glyceryl laurate such as the product sold under the name IMWITOR 312® by the company HULS, polyglyceryl-2 stearate, polyglyceryl-2 triisostearate, sorbitan tristearate or glyceryl ricinoleate;

lecithins, such as soya lecithins (such as Emulmetik 100 J from Cargill, or Biophilic H from Lucas Meyer);

silicone emulsifiers.

The silicone emulsifier that can be used in the composition according to the invention is a siloxane polymer comprising:

a fatty side chain, an oxyethylene or oxypropylene side chain and/or a polyethoxyl (=glyceryl) side chain, and optionally a silicone side chain.

The fatty side chain of the silicone emulsifier may have good compatibility with the fatty phase of the water-in-oil emulsion. The silicone side chain may have good compatibility with the non-volatile silicone oil, when the non-volatile oil of the cosmetic emulsion of the invention is a silicone oil. According to one embodiment of the invention, the silicone emulsifier comprises a fatty side chain and a silicone side chain.

More particularly according to the invention, the silicone emulsifier is chosen from the group comprising:

the compound of the following formula [CHEM2] in which w is an integer ranging from 1 to 1000, x' is an integer ranging from 1 to 50, x, y and z represent independently of each other an integer ranging from 1 to 100:

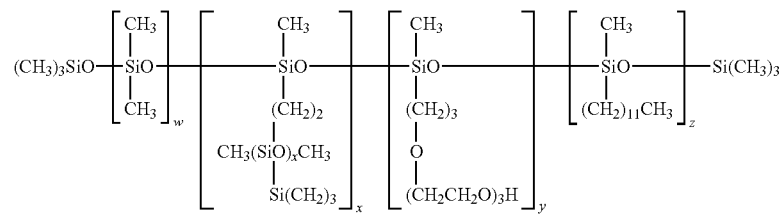

[Chem. 2]

the compound of the following formula [CHEM3] in which x1 is an integer ranging from 1 to 1000, w1 is an integer ranging from 1 to 50, y1 and z1 represent independently of each other an integer ranging from 1 to 100:

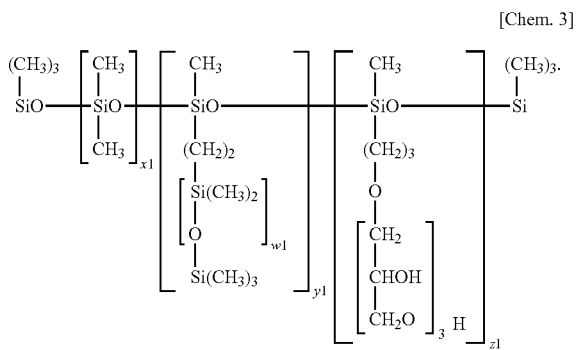

[Chem. 3]

the compound of the following formula [CHEM4] in which w2 is an integer ranging from 1 to 1000, v2 is an integer ranging from 1 to 50, x2, y2 and z2 represent independently of each other an integer ranging from 1 to 100:

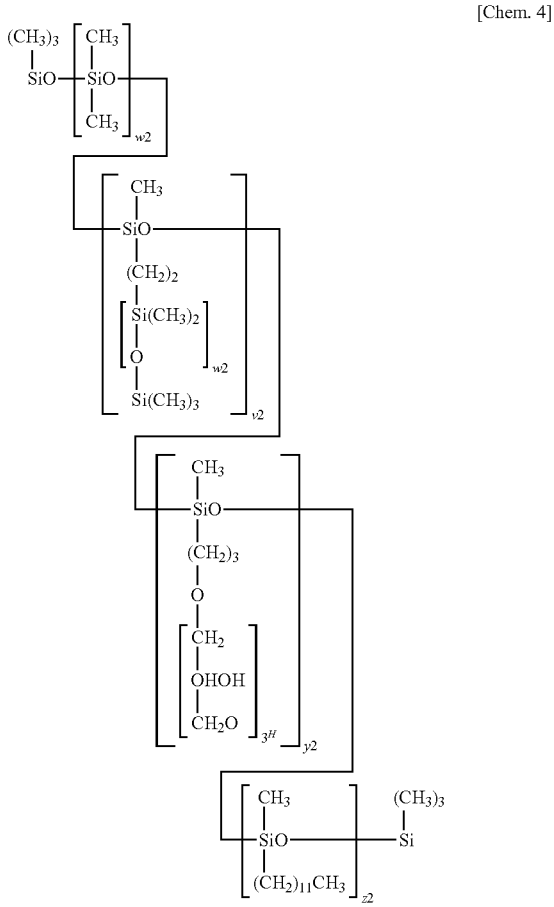

[Chem. 4]

the mixture of cyclomethicone/dimethicone copolyol sold under the name Q2-3225C® by the company DOW CORNING, and mixtures thereof.

According to a particular embodiment, the silicone emulsifier is chosen from the group comprising the siloxane polymers sold by the company SHIN-ETSU under the references KF6038, KF6104, KF6105, KF6106 and mixtures thereof.

The compound KF6038, with the INCI name "Lauryl PEG-9 Polydimethylsiloxyethyl Dimethicone" complies with the general formula (I). This siloxane polymer comprises a silicone side chain, an oxyethylene side chain and a fatty side chain (lauryl).

The compound KF6104, with the INCI name "Polyglyceryl-3 Polydimethylsiloxyethyl Dimethicone", and the compound KF6106, with the INCI name "Polyglyceryl-3 Polydimethylsiloxyethyl Dimethicone", comply with the general formula (II). This siloxane polymer comprises a silicone side chain and a glyceryl side chain.

The compound KF6105, with the INCI name "Lauryl Polyglyceryl-3 Polydimethylsiloxyethyl Dimethicone", complies with the general formula (III). This siloxane polymer comprises a silicone side chain, a glyceryl side chain and a fatty (lauryl) side chain.

In a preferred embodiment, in particular when the composition comprises silicon oils, the surfactant is chosen from silicone surfactants such as the compound KF6028 or the compound KF6038 or a mixture thereof.

The silicone emulsifier is present in the cosmetic composition of the invention in a proportion ranging from 0.1% to 5%, preferably from 1% to 3%, the percentages being percentages by weight with respect to the total weight of the composition.

In a preferred embodiment, in particular when the composition comprises hydrocarbon oils, the surfactant is chosen from non-silicone surfactants, preferably polysorbate 20.

The composition according to the invention may contain from 0.1% to 5% by weight emulsifier, with respect to the total weight of said composition, preferably 1% to 3% by weight.

Film-Forming Polymer

The composition according to the invention may also comprise at least one film-forming polymer.

Among the film-forming polymers that can be used in the compositions of the present invention, mention can be made of synthetic polymers, of the radical type or polycondensate type, polymers of natural origin, and mixtures thereof.

Radical film-forming polymer means a polymer obtained by polymerisation of unsaturated monomers, in particular ethylenic, each monomer being able to homopolymerise (unlike polycondensates).

Film-forming polymers of the radical type may in particular be vinyl polymers or copolymers, in particular acrylic polymers.

Vinyl film-forming polymers may result from the polymerisation of ethylenic unsaturated monomers having at least one acid group and/or esters of these acid monomers and/or amides of these acid monomers.

As a monomer carrying an acid group, use can be made of α,β-ethylenic unsaturated carboxylic acids such as acrylic acid, methacrylic acid, crotonic acid, maleic acid, or itaconic acid. Preferably use is made of (meth)acrylic acid, itaconic acid and crotonic acid, and more preferentially itaconic acid (for example a metal salt of poly (itaconic acid) such as the one sold under the commercial reference REVCARE NE 100S by the company Itaconix).

The monomer acid esters are advantageously chosen from esters of methacrylic acid (also called methacrylates), in particular alkyl methacrylates, especially $C_1$-$C_{30}$ alkyl methacrylates, preferably $C_1$-$C_{20}$, aryl methacrylates, in particular $C_6$-$C_{10}$ aryl methacrylates, hydroxyalkyl methacrylates, in particular $C_2$-$C_6$ hydroxyalkyl methacrylates.

Among alkylmethacrylates, mention can be made of methyl methacrylate, ethyl methacrylate, butyl methacrylate, isobutyl methacrylate, ethyl-2 hexyl methacrylate, lauryl methacrylate and cyclohexyl methacrylate.

Among hydroxyalkyl methacrylates, mention can be made of hydroxyethyl acrylate, 2-hydroxypropyl acrylate, hydroxyethyl methacrylate and 2-hydroxypropyl methacrylate.

Among aryl methacrylates, mention can be made of benzyl acrylate and phenyl acrylate.

The particularly preferred methacrylic acid esters are alkyl methacrylates.

According to the present invention, the alkyl group of the esters may be either fluorinated or perfluorinated, that is to say some or all of the hydrogen atoms in the alkyl group are substituted by fluorine atoms.

As monomer acid amides, mention can for example be made of methacrylamides, and in particular N-alkyl methacrylamides, in particular $C_2$-$C_{12}$ alkyl methacrylamides. Among N-alkyl methacrylamides, mention can be made of N-ethyl acrylamide, N-tert-butyl acrylamide, N-tert-octyl acrylamide and N-undecyl acrylamide.

Vinyl film-forming polymers may also result from the homopolymerisation or copolymerisation of monomers chosen from vinyl esters and styrene monomers. In particular, these monomers may be polymerised with acid monomers and/or esters thereof and/or amides thereof, such as those mentioned above.

As an example of vinyl esters, mention can be made of vinyl acetate, vinyl neodecanoate, vinyl pivalate, vinyl benzoate and vinyl tert-butyl benzoate.

As styrene monomers, mention can be made of styrene and alpha-methyl styrene.

Mention can also be made of styrene/butadiene block copolymers such as the products from the company Kraton, or OLEOFLEX EG 200 from the company APPLECHEM.

Among film-forming polycondensates, mention can be made of polyurethanes, polyesters, polyester amides, polyamides and epoxy ester resins and polyureas.

Polyurethanes may be chosen from anionic, cationic, non-ionic or amphoteric polyurethanes, acrylic polyurethanes, polyurethane-polyvinyl pyrrolidones, polyester-polyurethanes, polyether-polyurethanes, polyureas, polyurea-polyurethanes, and mixtures thereof.

The polyesters can be obtained, in a known fashion, by polycondensation of carboxylic acids with polyols, in particular diols.

The dicarboxylic acid may be aliphatic, alicyclic or aromatic. Mention can be made as an example of such acids of: oxalic acid, malonic acid, dimethylmalonic acid, succinic acid, glutaric acid, adipic acid, pimelic acid, 2,2-dimethylglutamic acid, azelaic acid, suberic acid, sebacic acid, fumaric acid, maleic acid, itaconic acid, phthalic acid, dodecanedioic acid, 1,3-cyclohexane dicarboxylic acid, 1,4-cyclohexane dicarboxylic acid, 1,3-cyclohexane dicarboxylic acid, 1,4-cyclohexane dicarboxylic acid, isophthalic acid, terephthalic acid, 2,5-norbornane dicarboxylic acid, diglycolic acid, thiodipropionic acid, 2,5-naphthalene dicarboxylic acid and 2,6-naphthalene dicarboxylic acid. These dicarboxylic acid monomers can be used alone or in combination of at least two dicarboxylic acid monomers. Among these monomers, phthalic acid, isophthalic acid or terephthalic acid is preferentially chosen.

The diol can be chosen from aliphatic, alicyclic or aromatic diols. Use is preferably made of a diol chosen from: ethylene glycol, diethylene glycol, triethylene glycol, 1,3-propane diol, cyclohexane dimethanol and 4-butane diol. As other polyols, glycerol, pentaerythritol, sorbitol or trimethylol propane can be used.

Polyester amides can be chosen in a similar manner to polyesters, by polycondensation of diacids with diamines or amine alcohols. As a diamine, use can be made of ethylenediamine, hexamethylenediamine or meta- or para-phenylenediamine. As amino alcohol, monoethanolamine can be used. As polyamide resins, mention can also be made of the one corresponding to the INCI name DIISOSTEARYL MALATE & BIS DIOCTADECYLAMIDE DIMER DILINOLEIC ACID/ETHYLENE DIAMINE COPOLYMER sold under the name Haimalate PAM by the company Kokyu Alcohol Kogyo.

The polyester may further comprise at least one monomer carrying at least one -SO3M group, with M representing a hydrogen atom, an ammonium ion $NH_4+$ or a metal ion, such as for example an Na+, Li+, K+, Mg2+, Ca2+, Cu2+, Fe2+, Fe3+ ion. A bifunctional aromatic monomer comprising such a —SO3M group can in particular be used.

The aromatic core of the bifunctional aromatic monomer further carrying a —SO3M group as described above can be chosen for example from benzene, naphthalene, anthracene, diphenyl, oxydiphenyl, sulfonyldiphenyl or methylenediphenyl cores. Mention can be made as an example of a bifunctional aromatic monomer also carrying a —SO3M group: sulfoisophthalic acid, sulfoterephthalic acid, sulfophthalic acid and 4-sulfonaphthalene-2,7-dicarboxylic acid.

Copolymers based on isophthalate/sulfoisophthalate can be used, and more particularly copolymers obtained by condensation of diethylene glycol, cyclohexanedimethanol, isophthalic acid or sulfoisophthalic acid.

Polymers of natural origin, optionally modified, can be chosen from shellac resin, sandarac gum, gum arabic (ACACIA SENEGAL GUM), dammars, elemis, copals, cellulosic polymers, polymers extracted from the fruit of *Caesalpinia spinosa* and/or from the alga Kappaphycus alvarezii (such as the product Filmexel® sold by the company Silab), and mixtures thereof. A natural polymer such as Filmexel® makes it possible in particular to improve the strength of the film obtained from the composition according to the invention. Mention can also be made of the film-forming polymers corresponding to the name INCI SHOERA ROBUSTA RESIN+ BEESWAX, SHOERA ROBUSTA RESIN+SUNFLOWER OIL, ARAUCARIA+SUNFLOWER OIL, ARAUCARIA+CASTOR OIL, SHOERA ROBUSTA+OCTYLDODECANOL According to one embodiment, the film-forming polymer may be a polymer solubilised in a liquid fatty phase comprising organic solvents or oils (it is then said that the film-forming polymer is a liposoluble polymer).

By way of example of liposoluble polymer, mention can be made of copolymers of vinyl ester (the vinyl group being directly bonded to the oxygen atom of the ester group and the vinyl ester having a saturated hydrocarbon radical, linear or branched, from 1 to 19 carbon atoms, bonded to the carbonyl of the ester group) and at least one other monomer, which may be a vinyl ester (different from the vinyl ester already present), an α-olefin (having from 8 to 28 carbon atoms), an alkylvinyl ether (the alkyl group of which comprises from 2 to 18 carbon atoms), or an allyl or methallyl ester (having a saturated hydrocarbon radical, linear or branched, from 1 to 19 carbon atoms, bonded to the carbonyl of the ester group).

These copolymers can be crosslinked by means of crosslinking agents which may be either of the vinyl type or of the allyl or methallyl type, such as tetraallyloxyethane, divinylbenzene, divinyl octanedioate, divinyl dodecanedioate and divinyl octadecanedioate.

As examples of these copolymers, mention can be made of the following copolymers: vinyl acetate/allyl stearate, vinyl acetate/vinyl laurate, vinyl acetate/vinyl stearate, vinyl acetate/octadecene, vinyl acetate/octadecyl vinyl ether, vinyl propionate/allyl laurate, vinyl propionate/vinyl laurate, vinyl stearate/octadecene-1, vinyl acetate/dodecene-1, vinyl stearate/ethyl vinyl ether, vinyl propionate/cetyl vinyl ether, vinyl stearate/allyl acetate, vinyl 2,2-dimethyloctanoate/vinyl laurate, allyl 2,2-dimethyl pentanoate/vinyl laurate, vinyl dimethyl propionate/vinyl stearate, allyl dimethylpropionate/vinyl stearate, vinyl propionate/vinyl stearate, crosslinked with 0.2% divinylbenzene, vinyl dimethyl propionate/vinyl laurate, crosslinked with 0.2% divinylbenzene, vinyl acetate/octadecyl vinyl ether, crosslinked with 0.2% tetraallyloxyethane, vinyl acetate/allyl stearate, crosslinked with 0.2% divinylbenzene, vinyl acetate/octadecene-1 crosslinked with 0.2% divinylbenzene, and allyl propionate/allyl stearate crosslinked with 0.2% divinylbenzene.

As liposoluble film-forming polymers, mention can also be made of liposoluble copolymers, and in particular those resulting from copolymerisation of vinyl esters having 9 to 22 carbon atoms or alkyl acrylates or methacrylates, the allyl radicals having from 10 to 20 carbon atoms.

Such liposoluble copolymers may be chosen from the copolymers of vinyl polystearate, vinyl polystearate crosslinked by means of divinylbenzene, diallyl ether or diallyl phthalate, the copolymers of poly (stearyl methacrylate), vinyl polylaurate, poly (lauryl methacrylate), these polymethacrylates being able to be crosslinked by means of methylene glycol dimethacrylate or tetraethylene glycol.

The liposoluble copolymers defined above are known and are in particular described in the application FR-A-2232303; they may have a mean molecular weight ranging from 2,000 to 500,000 and preferably from 4,000 to 200,000.

Mention can also be made of liposoluble homopolymers, and in particular those resulting from the homopolymerisation of vinyl esters having from 9 to 22 carbon atoms or alkyl acrylates or methacrylates, the alkyl radicals having from 2 to 24 carbon atoms.

As examples of liposoluble homopolymers, mention can be made in particular of: polyvinyl laurate and poly (lauryl methacrylate), these polymethacrylates being able to be crosslinked by means of ethylene glycol dimethacrylate or tetraethylene glycol.

As liposoluble film-forming polymers that can be used in the invention, mention can also be made of polyalkylenes and in particular $C_2$-$C_{20}$ alkene copolymers, such as polybutene, alkyl celluloses with a linear or branched alkyl radical, saturated or not, $C_1$ to $C_8$, such as ethyl cellulose and propyl cellulose, vinyl pyrrolidone (VP) copolymers and in particular copolymers of vinyl pyrrolidone and alkene, $C_2$ to $C_{40}$ and even better $C_3$ to $C_{20}$. By way of an example of VP copolymer that can be used in the invention, mention can be made of the copolymer of VP/vinyl acetate, VP/ethyl methacrylate, butylated polyvinyl pyrrolidone (PVP), VP/ethyl methacrylate/methacrylic acid, VP/cicosene (ANTARON V220 sold by the company Ashland), VP/hexadecene (ANTARON V216 sold by the company Ashland), VP/triacontene, VP/styrene, VP/acrylic acid/lauryl methacrylate.

Mention can also be made of dextrin esters and in particular:

dextrin isostearate and isostearic acid sold under the name UNIFILMA HVY by the company Chiba Flour Milling
dextrin palmitate/ethyl hexanoate sold under the name RHEOPEARL TT by the company Chiba Flour Milling
dextrin myristate sold under the name RHEOPEARL MKL2 by the company Chiba Flour Milling Mention can also be made of sugar esters and in particular sucrose acetate isobutyrate sold under the name EASTMAN SUSTANE SA1B by the company EASTMAN.

Mention can also be made of silicone resins, generally soluble or swelling in silicone oils, which are crosslinked polyorganosiloxane polymers. Silicone resins are known by the name "MDTQ", the resin being described according to the various monomeric siloxane units that it comprises, each of the letters "MDTQ" characterising a type of unit.

By way of examples of polymethylsilsesquioxane resins commercially available, mention can be made of those that are sold by the company Wacker under the reference Resin MK such as Belsil PMS MK, and by the company SHIN-ETSU under the references KR-220L, or the SilForm flexible resin.

As siloxysilicate resins, mention can be made of trimethylsiloxysilicate (TMS) resins such as those sold under the reference SR1000 by the company General Electric or under the reference TMS 803 by the company Wacker. Mention can also be made of the trimethylsiloxysilicate resins marketed in a solvent such as cyclomethicone, sold under the name "KF-7312J" by the company Shin-Etsu, "DOWSIL™ RSN-0749", or "DOWSIL™ 593 Fluid" by the company Dow Corning.

Mention can also be made of the copolymers of silicone resins such as those cited above with polydimethylsiloxanes, such as the pressure-sensitive adhesive copolymers sold by the company Dow Corning under the reference BIO-PSA and described in the document U.S. Pat. No. 5,162,410, or the silicone copolymers resulting from the reaction of a silicone resin, such as those described above, and a diorganosiloxane as described in the document WO 2004/073626.

It is also possible to use copolymers with a non-silicone organic skeleton grafted by monomers containing a polysiloxane unit, such as for example the butyl acrylate/hydroxypropyl dimethicone acrylate copolymer sold under the name GRANACRYSIL BAS by the company GRANT.

Finally, mention can be made of the acrylate/polytrimethylsiloxymethacrylate copolymers comprising a dendrimer carbosiloxane structure grafted on a vinyl skeleton available commercially under the references DOW CORNING FA 4002 ID or DOW CORNING FA 4001 CM.

It is also possible to use silicone polyamides of the polyorganosiloxane type such as those described in the documents U.S. Pat. Nos. 5,874,069, 5,919,441, 6,051,216 and 5,981,680.

In a preferred embodiment, the composition according to the invention comprises from 1% to 15% by weight of a film-forming polymer, preferably 5% to 12% by weight of at least one film-forming polymer.

Silicone Elastomers

The composition according to the invention may also comprise a silicone elastomer.

Among these, mention can be made of the at least partially crosslinked polymers resulting from the reaction of an organopolysiloxane carrying unsaturated groups, such as vinyl or allyl groups, situated at the end or middle of the chain, preferably on a silicon atom, with another reactive silicone compound such as an organohydrogenopolysiloxane. These polymers are normally available in gel form in a volatile or non-volatile silicone solvent or in a hydrocarbon solvent. Examples of such elastomers are in particular sold by the company SHIN ETSU under the trade names KSG-6, KSG-16, KSG-31, KSG-32, KSG-41, KSG-42, KSG-43 and KSG-44, and by the company DOW CORNING under the trade names DOWSIL™ 9040 and DOWSIL™ 9041. Another oily gelling agent consists of a silicone polymer, obtained self-polymerisation of an organopolysiloxane functionalised by epoxy and hydrosilyl groups, in the presence of a catalyst, which is commercially available from the company General Electric under the trade name VELVESIL® 125. Another lipophilic gelling agent consists of a cyclic dimethicone/vinyl dimethicone copolymer such as the one sold by the company JEEN under the trade name JEESILC® PS (including PS-VH, PS-VHLV, PS-CM, PS-CMLV and PS-DM).

According to a preferred embodiment, the silicone elastomer may be emulsifying, preferably chosen from the polyoxyalkylene and polyglycerol silicone elastomers.

As polyoxyalkylene silicone elastomers, mention can be made of those described in the patents U.S. Pat. Nos. 5,236,986, 5,412,004, 5,837,793, 5,811,487.

As polyoxyalkylene silicone elastomers, use can be made of: those with the INCI name PEG-10 Dimethicone/Vinyl dimethicone crosspolymer: such as those sold under the names "KSG-21", "KSG-20", by Shin Etsu;—those with the INCI name Lauryl PEG-15 Dimethicone/Vinyldimethicone Crosspolymer: such as those sold under the names "KSG-30" and "KSG-31", "KSG-32" (in isododecane), "KSG-33" (in trioctanoin), "KSG-210", "KSG-310" (in a mineral oil), "KSG-320" (in isododecane), "KSG-330", "KSG-340" by the company Shin Etsu.

As polyglycerol silicone elastomers, use can be made of:—those with the INCI name Dimethicone (and) Dimethicone/Polyglycerin-3 crosspolymer: such as those sold under the names "KSG-710" by Shin Etsu; those with the INCI name Lauryl Dimethicone/Polyglycerin-3 crosspolymer: such as those sold under the names "KSG-840" (in squalene) by the company Shin Etsu.

Aqueous Phase

The composition according to the invention may also comprise an aqueous phase comprising water and optionally at least one water-soluble solvent other than the previously described polyols.

"Water-soluble solvent" means in the present invention a compound that is liquid at ambient temperature and is miscible with water (miscibility in water greater than 50% by weight at 25° C. and atmospheric pressure).

The water-soluble solvents that can be used in the compositions according to the invention may be volatile.

Among the water-soluble solvents that can be used in the compositions according to the invention, mention can be made in particular of monoalcohols having 1 to 5 carbon atoms such as ethanol and isopropanol, $C_3$-$C_4$ ketones and $C_2$-$C_4$ aldehydes.

According to a preferred embodiment, the composition according to the invention is free from water.

Cosmetic Active Agent

The composition according to the invention may also comprise at least one cosmetic active agent, which may be chosen from the group consisting of vitamins, antioxidants, hydrating agents, antipollution agents, keratolytic agents, astringents, anti-inflammatoireteners, self-tanning agents and agents promoting microcirculation.

Examples of vitamins include vitamins A, B1, B2, B6, C and E and derivatives thereof, pantothenic acid and derivatives thereof and biotin.

Examples of antioxidants include ascorbic acid and derivatives thereof such as ascorbyl palmitate, ascorbyl tetraisopalmitate, ascorbyl glucoside, magnesium ascorbyl phosphate, sodium ascorbyl phosphate and ascorbyl sorbate; tocopherol and derivatives thereof, such as tocopherol acetate, tocopherol sorbate and other tocopherol esters; BHT and BHA; gallic acid esters, phosphoric acid, citric acid, maleic acid, malonic acid, succinic acid, fumaric acid, cephalin, hexametaphosphate, phytic acid, and plant extracts, for example *Zingiber officinale* (ginger) roots such as Blue *Malagasy* Ginger sold by the company BIOLANDES, *Chondrus crispus, Rhodiola, Thermus thermophilus*, mate leaf, oak wood, Kayu Rapet bark, sakura leaves and ylang ylang leaves.

Examples of hydrating agents include polyethylene glycol, propylene glycol, dipropylene glycol, glycerine, butylene glycol, xylitol, sorbitol, maltitol, mucopolysaccharides such as chondroitin sulphuric acid, hyaluronic acid with high and low molecular weights or hyaluronic acid potentialised by a silanol derivative such as the active agent Epidermosil® sold by the company Exymol, and mucoitinsulfuric acid; caronic acid, atelocollagen; chlorestearyl-12-hydroxystearate, biliary salts, a principal component of NHF (natural hydration factor) such as a pyrrolidone carboxylic acid salt and a lactic acid salt, an amino acid analogue such as urea, cysteine and serine; a short-chain soluble collagen, PPG diglycerins, homo- and copolymers of 2-methacryloyloxyethylphosphonylcholine such as Lipidure HM and Lipidure PBM from NOF; allantoin; glycerin derivatives such as PEG/PPG/polybutylene Glycol-8/5/3 glycerin from NOF sold under the trade name Wilbride®S753 or glycerylpolymethacrylate from Sederma sold under the trade name Lubragel®MS; the trimethylglycine sold under the trade name Aminocoat® by the company Ashahi Kasei Chemicals and various extracts of plants such as extracts of *Castanea sativa*, hydrolysed hazelnut proteins, polysaccharides of *Polianthes tuberosa, Argania spinosa* kernel oil and the extracts of nacre containing a conchiolin that are sold in particular by the company Maruzen (Japan) under the trade name Pearl Extract®.

Other examples of hydrating agents include the compounds stimulating the expression of the matriptase MT/SP1, such as a carob pulp extract, as well as the agents stimulating the expression of CERT, ARNT2 or FN3K or FN3K RP; the agents increasing the proliferation or differentiation of keratinocytes, either directly, or indirectly by stimulating for example the production of β-endorphins, such as the extracts of *Thermus thermophilus* or of husks of *Theobroma cacao* beans, water-soluble extracts of maize, peptide extracts of *Voandzeia subterranea* and niacinamide; epidermal lipids and agents increasing the synthesis of epidermal lipids, either directly, or by stimulating certain β-glucosidases that modulate the deglycosylation of lipid precursors such as glucosylceramide into ceramides, such as phospholipids, ceramides, lupin protein hydrolysates and dihydrojasmonic acid derivatives.

Examples of antipollution agents include the extract of *Moringa pterygosperma* seeds (for example Purisoft® from LSN); extract of shea butter (for example Detoxyl® from Silab), a mixture of extract of ivy, phytic acid and sunflower seed extract (for example Osmopur® from Sederma).

Examples of keratolytic agents include α-hydroxyacids (for example glycolic, lactic, citric, malic, mandelic or tartric acids) and β-hydroxy acids (for example salicylic acid), and esters thereof, such as the $C_{12-13}$ alkyl lactates, and the extracts of plants containing these hydroxy acids, such as extracts of *Hibiscus sabdriffa*.

Examples of astringents include *hamamelis* extracts.

Examples of anti-inflammatory agents include bisabolol, allantoin, tranexamic acid, zinc oxide, sulfur oxide and derivatives thereof, chondroitin sulphate, glycyrrhizinic acid and derivatives thereof such as glycyrrhizinates.

Examples of whitening agents include arbutin and derivatives thereof, ferulic acid (such as Cytovector®: water, glycol, lecithin, ferulic acid, hydroxyethylcellulose, sold by BASF) and derivatives thereof, kojic acid, resorcinol, lipoic acid and derivatives thereof such as resveratrol diacetate monolipoate as described in the patent application WO 2006/134282, ellagic acid, leucodopachrome and derivatives thereof, vitamin B3, linoleic acid and derivatives thereof, ceramids and homologues thereof, a peptide as described in the patent application WO 2009/010356, a bioprecursor as described in the patent application WO 2006/134282 or a tranexamate salt such as the tranexamate cetylic hydrochloride salt, a liquorice extract (*Glycyrrhiza glabra* extract), which is sold in particular by the company Maruzen under the trade name LICORICE EXTRACT, a whitening agent also having an antioxidant effect, such as the vitamin C compounds, including ascorbate salts, ascorbyl esters of fatty acids or of sorbic acid, and other ascorbic acid derivatives, for example ascorbyl phosphates, such as magnesium ascorbyl phosphate and sodium ascorbyl phosphate, or the saccharide esters of ascorbic acid, which include, for example, ascorbyl-2-glucoside, 2-O-alpha-D-glucopyranosyl L-ascorbate, or 6-O-beta-D-galactopyranosyl L-ascorbate. An active agent of this type is sold in particular by the company DKSH under the trade name ASCORBYL GLUCOSIDE.

An example of self-tanning agent is DHA.

Examples of agents promoting microcirculation include a lupin extract (such as Eclaline® from Silab), butcher's broom, horse chestnut, ivy, *ginseng* or melilot, caffeine, nicotinate and derivatives thereof, an extract of *Corallina officinalis* alga such as the one sold by CODIF; and mixtures thereof. These active agents on skin microcirculation may be used in order to prevent the complexion becoming dull and/or to improve complexion homogenisation and shine.

Additives

The composition according to the invention may comprise other ingredients provided that they do not interfere with the required properties of the composition. These other ingredients may for example be preservatives, pH adjusters such as citric acid or arginine, antimicrobial agents, perfumes, sun filters, and mixtures thereof.

Preparation Method

Another object of the present invention is a method for preparing a solid cosmetic composition according to the invention, comprising:

preparation of a fatty binder comprising the volatile liquid fatty phase and the film-forming polymer pre-mixing of the powders constituting the mashing of the powders with the fatty acid by extrusion, and shaping of the composition by pressing.

Make-Up Method with Keratin Materials

The present invention also relates to a method for making up the skin or lips, consisting of applying to the skin or lips a solid cosmetic composition according to the invention.

Example

Eyeshadow

Solid eyeshadow is prepared having the composition presented in table 1 below.

TABLE 1

| INCI name | Content (% by weight) | |
|---|---|---|
| | OAP 1 | OAP 2 |
| Inorganic pigments (non-coated) | | |
| inorganic pigments coated with magnesium stearate | | |
| Organic pigments | | |
| Nacre (non-coated) | 8.63 | 8.63 |
| Nacre coated with magnesium stearate | 41.18 | 41.18 |
| Lamellar filters coated with magnesium stearate | | |
| Spherical fillers (Cellulobeads) coated with magnesium stearate | 14.60 | 14.60 |
| Trimethylsiloxysilicate (Belsil TMS803) | 5.40 | 5.40 |
| Butyl acrylate/hydroxypropyl dimethicone acrylate copolymer (Granacrysil BAS) | 3.65 | 3.65 |
| Dimethicone crosspolymer from DOWSIL 9041 (% DOWSIL 9041) | 0.22 (1.46) | 0.22 (1.46) |
| Dimethicone from DOWSIL 9041 | 1.24 | 1.24 |
| Ethylhexyl polyhydroxystearate (Dub Estoline) | 1.46 | 1.46 |
| PEG-9 polydimethylsiloxyethyldimethicone (KF6028) | 0.73 | 0.73 |
| Isododecane | 21.60 | |
| C9-12 alkane (Vegelight Silk) | | 21.60 |

The powders constituting the powdery phase were pre-mixed.

Next the non-volatile fatty binder comprising the fatty phase (liquid and solid) was prepared. The powders were mashed with the non-volatile fatty binder by extrusion and then mashing was carried out with the addition of volatile solvent by extrusion, introducing the volatile solvent into an orifice downstream of the extrusion device.

The compositions were next shaped by pressing.

The eyeshadows obtained have good cohesion and good resistance to impacts. In particular, they can be stored and transported without crumbling or cracking. The texture thereof allows easy removal and application. The eyeshadows have good maintenance over time of coverage and colour.

The invention claimed is:

1. A solid cosmetic composition comprising:
   at least 15% by weight of a volatile liquid fatty phase comprising $C_8$-$C_{16}$ branched alkanes, and
   40% to 85% by weight of a powdery phase comprising spherical fillers which are surface-treated with a metallic soap, wherein the spherical fillers are cellulose microspheres, and wherein the metallic soap is chosen from zinc borate, magnesium stearate, magnesium myristate, zinc stearate, and mixtures thereof, and
   the percentages being expressed by weight, with respect to the total weight of the composition.

2. The solid cosmetic composition according to claim 1, wherein the powdery phase further comprises a lamellar filler which is surface-treated by a metallic soap, wherein the lamellar filler is selected from the group consisting of: talc, natural or synthetic mica, silicas, clays, trimethyl siloxysilicate, kaolin, bentone, calcium carbonate and magnesium hydrogen carbonate, hydroxyapatite, boron nitride, fluorphlogopite, perlite powders, an N-lauroyl lysine powder, sericite, calcium sodium borosilicate, calcium aluminium borosilicate, and mixtures thereof.

3. The solid cosmetic composition according to claim 1, wherein the powdery phase further comprises a nacre which is surface-treated with a metallic soap.

4. The solid cosmetic composition according to claim 1, wherein the solid cosmetic composition comprises:
   20% to 23% by weight of the volatile liquid fatty phase, and
   50% to 80% by weight of the powdery phase.

5. The solid cosmetic composition according to claim 4, wherein the solid cosmetic composition comprises:
   20% to 23% by weight of the volatile liquid fatty phase, and
   60% to 75% by weight of the powdery phase.

6. The solid cosmetic composition according to claim 1, further comprising 1% to 15% by weight of a film-forming polymer.

7. The solid cosmetic composition according to claim 1, wherein the powdery phase comprises pigments, optionally surface-treated with a metallic soap.

8. The solid cosmetic composition according to claim 1, further comprising a non-volatile liquid fatty phase.

9. The solid cosmetic composition according to claim 8, wherein the solid cosmetic composition comprises from 0.1% to 10% by weight of a non-volatile oil.

10. The solid cosmetic composition according to claim 1, further comprising an emulsifier.

11. The solid cosmetic composition according to claim 1, further comprising a solid fatty phase.

12. The solid cosmetic composition according to claim 1, wherein the solid cosmetic composition is free from water.

13. The solid cosmetic composition according to claim 1, further comprising a silicone elastomer.

14. The solid cosmetic composition according to claim 1, further comprising 5% to 12% by weight of a film-forming polymer.

15. The solid cosmetic composition according to claim 1, wherein the metallic soap is magnesium stearate.

16. The solid cosmetic composition according to claim 1, wherein the volatile liquid fatty phase comprises isododecane.

17. A solid cosmetic composition comprising:
   at least 15% by weight of a volatile liquid fatty phase comprising isododecane, and
   40% to 85% by weight of a powdery phase comprising cellulose microspheres which are surface-treated with magnesium stearate, and
   the percentages being expressed by weight, with respect to the total weight of the composition.

18. A method for preparing a solid cosmetic composition according claim 1, comprising:
   pre-mixing of the powders constituting the powdery phase;
   preparing a fatty binder comprising the volatile liquid fatty phase and the film-forming polymer;
   mashing of the powders with the fatty binder by extrusion; and
   shaping of the composition by pressing.

19. A method for making up the skin or lips, consisting of applying to the skin or lips a solid cosmetic composition according to claim 1.

* * * * *